(12) United States Patent
Vogler (10) Patent No.: US 6,577,663 B2
(45) Date of Patent: Jun. 10, 2003

(54) NARROW BANDWIDTH OSCILLATOR-AMPLIFIER SYSTEM

(75) Inventor: Klaus Vogler, Goettingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/923,770

(22) Filed: Aug. 6, 2001

(65) Prior Publication Data

US 2002/0021729 A1 Feb. 21, 2002

Related U.S. Application Data

(63) Continuation-in-part of application No. 09/883,128, filed on Jun. 15, 2001.
(60) Provisional application No. 60/228,184, filed on Aug. 25, 2000, provisional application No. 60/212,301, filed on Jun. 19, 2000, and provisional application No. 60/297,199, filed on Jun. 7, 2001.

(51) Int. Cl.[7] .................................................. H01S 3/22
(52) U.S. Cl. ...................... 372/57; 372/29.021; 372/59; 372/29.02; 372/19; 372/58
(58) Field of Search ................................ 372/57, 29.02, 372/29.021, 59, 19, 58

(56) References Cited

U.S. PATENT DOCUMENTS

| | | | |
|---|---|---|---|
| 3,471,800 A | 10/1969 | Congleton et al. | 331/94.5 |
| 3,546,622 A | 12/1970 | Peterson et al. | 331/94.5 |
| 3,609,586 A | 9/1971 | Hans et al. | 331/94.5 |
| 4,393,505 A | 7/1983 | Fahlen | 372/57 |
| 4,616,908 A | 10/1986 | King | 350/576 |
| 4,691,322 A | 9/1987 | Nozue et al. | 372/82 |
| 4,829,536 A | 5/1989 | Kajiyama et al. | 372/57 |
| 4,856,018 A | 8/1989 | Nozue et al. | 372/98 |
| 4,860,300 A | 8/1989 | Bauemler et al. | 372/57 |
| 4,881,231 A | 11/1989 | Jain | 372/32 |
| 4,905,243 A | 2/1990 | Lokai et al. | 372/32 |
| 4,926,428 A | 5/1990 | Kajiyama et al. | 372/20 |
| 4,975,919 A | 12/1990 | Amada et al. | 372/33 |

(List continued on next page.)

FOREIGN PATENT DOCUMENTS

| | | | |
|---|---|---|---|
| DE | 40 15 861 A1 | 11/1991 | H01S/3/225 |
| DE | 298 22 090 U 1 | 3/1999 | H01S/3/225 |
| EP | 0 472 727 B1 | 3/1992 | H01S/3/1055 |
| EP | 0 820 132 A2 | 1/1998 | H01S/3/0975 |
| EP | 1 041 689 A1 | 10/2000 | H01S/3/1055 |
| EP | 1 102 368 A2 | 3/2001 | H01S/3/081 |
| EP | 1 119 083 A2 | 7/2001 | H01S/3/08 |

OTHER PUBLICATIONS

Marcus, S., "Cavity Dumping and Coupling Modulation of an Etalon–coupled CO2 Laser a)," *Journal of Applied Physics* Sep. 1982, vol. 53, No. 9, pp. 6029–6031.

(List continued on next page.)

*Primary Examiner*—Leon Scott, Jr.
(74) *Attorney, Agent, or Firm*—Sierra Patent Group, Ltd.; Andrew V. Smith (57) ABSTRACT

A molecular fluorine ($F_2$) laser system includes a seed oscillator and power amplifier. The seed oscillator includes a laser tube including multiple electrodes therein which are connected to a discharge circuit. The laser tube is part of an optical resonator for generating a laser beam including a first line of multiple characteristic emission lines around 157 nm. The laser tube is filled with a gas mixture including molecular fluorine and a buffer gas. A low pressure seed radiation generating gas lamp is alternatively used. The gas mixture is at a pressure below that which results in the generation of a laser emission including the first line around 157 nm having a natural linewidth of less than 0.5 pm. The power amplifier amplifies the power of the beam emitted by the seed oscillator to a desired power for applications processing.

88 Claims, 4 Drawing Sheets

U.S. PATENT DOCUMENTS

| | | | |
|---|---|---|---|
| 4,977,573 A | 12/1990 | Bittenson et al. | 372/81 |
| 4,985,898 A | 1/1991 | Furuya et al. | 372/106 |
| 5,025,445 A | 6/1991 | Anderson et al. | 372/20 |
| 5,095,492 A | 3/1992 | Sandstrom | 372/102 |
| 5,142,543 A | 8/1992 | Wakabayashi et al. | 372/32 |
| 5,150,370 A | 9/1992 | Furuya et al. | 372/106 |
| 5,161,238 A | 11/1992 | Mehmke | 359/738 |
| 5,221,823 A | 6/1993 | Usui | 219/121.78 |
| 5,255,282 A | 10/1993 | Remo | 372/82 |
| 5,337,330 A | 8/1994 | Larson | 372/86 |
| 5,396,514 A | 3/1995 | Voss | 372/57 |
| 5,404,366 A | 4/1995 | Wakabayashi et al. | 372/29 |
| 5,440,574 A | 8/1995 | Sobottke et al. | 372/34 |
| 5,450,207 A | 9/1995 | Fomenkov | 356/416 |
| 5,479,431 A | 12/1995 | Sobottke et al. | 372/92 |
| 5,535,233 A | 7/1996 | Mizoguchi et al. | 372/87 |
| 5,557,629 A | 9/1996 | Mizoguchi et al. | 372/87 |
| 5,559,584 A | 9/1996 | Miyaji et al. | 355/73 |
| 5,559,816 A | 9/1996 | Basting et al. | 372/27 |
| 5,596,596 A | 1/1997 | Wakabayashi et al. | 372/102 |
| 5,642,374 A | 6/1997 | Wakabayashi et al. | 372/57 |
| 5,684,822 A | 11/1997 | Partlo | 372/95 |
| 5,729,562 A | 3/1998 | Birx et al. | 372/38 |
| 5,729,565 A | 3/1998 | Meller et al. | 372/87 |
| 5,748,346 A | 5/1998 | David et al. | 359/15 |
| 5,763,855 A | 6/1998 | Shioji | 219/121.84 |
| 5,802,094 A | 9/1998 | Wakabayashi et al. | 372/57 |
| 5,811,753 A | 9/1998 | Weick et al. | 219/121.78 |
| 5,818,865 A | 10/1998 | Watson et al. | 372/86 |
| 5,835,520 A | 11/1998 | Das et al. | 372/57 |
| 5,852,627 A | 12/1998 | Ershov | 372/108 |
| 5,856,991 A | 1/1999 | Ershov | 372/57 |
| 5,898,725 A | 4/1999 | Fomenkov et al. | 372/102 |
| 5,901,163 A | 5/1999 | Ershov | 372/20 |
| 5,914,974 A | 6/1999 | Partlo et al. | 372/38 |
| 5,917,849 A | 6/1999 | Ershov | 372/102 |
| 5,936,988 A | 8/1999 | Partlo et al. | 372/38 |
| 5,940,421 A | 8/1999 | Partlo et al. | 372/38 |
| 5,949,806 A | 9/1999 | Ness et al. | 372/38 |
| 5,970,082 A | 10/1999 | Ershov | 372/102 |
| 5,978,391 A | 11/1999 | Das et al. | 372/20 |
| 5,978,394 A | 11/1999 | Newman et al. | 372/32 |
| 5,978,409 A | 11/1999 | Das et al. | 372/100 |
| 5,982,795 A | 11/1999 | Rothweil et al. | 372/38 |
| 5,982,800 A | 11/1999 | Ishihara et al. | 372/57 |
| 5,991,324 A | 11/1999 | Knowles et al. | 372/57 |
| 5,999,318 A | 12/1999 | Morton et al. | 359/572 |
| 6,002,697 A | 12/1999 | Govorkov et al. | 372/34 |
| 6,005,880 A | 12/1999 | Basting et al. | 372/38 |
| 6,014,206 A | 1/2000 | Basting et al. | 356/138 |
| 6,018,537 A | 1/2000 | Hoffmann et al. | 372/25 |
| 6,020,723 A | 2/2000 | Desor et al. | 320/166 |
| 6,028,872 A | 2/2000 | Partlo et al. | 372/38 |
| 6,028,879 A | 2/2000 | Ershov | 372/57 |
| 6,101,211 A | 8/2000 | Wakabayashi et al. | 372/102 |
| 6,137,821 A | 10/2000 | Ershov | 372/19 |
| 6,154,470 A | 11/2000 | Basting et al. | 372/19 |
| 6,157,662 A | 12/2000 | Scaggs et al. | 372/60 |
| 6,219,368 B1 | 4/2001 | Govorkov | 372/59 |
| 6,240,110 B1 | 5/2001 | Ershov | 372/20 |
| 6,285,701 B1 * | 9/2001 | Albrecht et al. | 372/57 |
| 6,359,922 B1 | 3/2002 | Partlo et al. | 372/58 |
| 6,370,174 B1 | 4/2002 | Onkels et al. | 372/38 |
| 6,381,256 B1 | 4/2002 | Stamm et al. | 372/19 |
| 6,381,257 B1 * | 4/2002 | Ershov et al. | 3272/57 |
| 6,393,037 B1 * | 5/2002 | Basting et al. | 372/20 |
| 6,404,796 B1 * | 6/2002 | Albrecht et al. | 372/57 |
| 2002/0006148 A1 | 1/2002 | Govorkov et al. | 372/55 |
| 2002/0021791 A1 * | 2/2002 | Vogler | 372/55 |
| 2002/0071468 A1 * | 6/2002 | Sandstrom et al. | 372/57 |

OTHER PUBLICATIONS

Mueckenheim, W., "Seven Ways to Combine Two Excimer Lasers," *Laser Focus/Electro–Optics*, Jul. 1987.

Mueckenheim, W., et al., "Excimer Laser with Narrow Linewidth and Large Internal Beam Divergence," *Journal of Physics E: Scientific Instruments* Nov. 1987; vol. 20, pp. 1394–1396.

Ishihara et al., "Theoretical Modeling of Microwave–Pumped High–Pressure Gas Lasers," *Applied Physics B*, 1989, vol. B 48., pp. 315–326.

D.R. Hall, et al., *The Physics and Technology of Laser Resonator*, 1989, pp. 1–20, 94–104, 117–131, 143–153, 176–189, 220–245.

Christensen, C.H., "Compact, Self–Contained ArF Lasers," *Performing Organization Report No. AFOSR IR 95–0370*, Jun. 1, 1991.

Kakehata et al., "Gain and Saturation Intensity Measurements of a Discharge Pumped F2 Laser at High Excitation Rates," *Applied Physics Letters* Dec. 28, 1992, vol. 61, No. 26, pp. 3089–3091.

Gruenefeld et al., "Operation of KrF and ArF Tunable Excimer Laser without Cassegrain Optics," *Applied Physics* Mar. 1996, vol. B 62, No. 3, pp. 241–247.

Bondelie, K., "Sealed Carbon Dioxide Lasers Achieve New Power Levels," *Laser Focus World*, Aug. 1996, pp. 95–100.

Lengfellner, H., "Generation of Tunable Pulsed Microwave Radiation by Nonlinear Interaction of Nd: YAG Laser Radiation in GaP Crystals," *Optics Letters* Mar. 1997, vol. 12, No. 3, pp. 184–186.

Bloomstein et al., "Critical Issues in 157 nm Lithography," *J. Vac. Sci. Technol. B: MicroElectronics and Nanometer Structures* Nov./Dec. 1998, vol. 16, No. 6, pp. 3154–3157.

Stamm, U., "Status of 157 nm Excimer Laser," *International SEMATECH 157 nm Workshop*, Feb. 15–17, 1999, Litchfield, AZ, USA.

Hoffmann et al., "Prospects of High Repetition Rate F2(157 nm) Laser for Microlithography," *International SEMATECH 157 Workshop*, Feb. 15–17, 1999.

Stamm, U., et al., "Excimer Laser for 157 nm Lithography," *Part of the SPIE Conference on Emerging Lithographic Technologies III*, Santa Clara, CA Mar. 1999, pp. 816–826.

Hoffman et al., "Revisiting F2 Laser for DUV Microlithography," *Proceedings of SPIE: Optical Microlithography XII* Mar. 17–19, 1999; vol. 3679, pp. 541–546.

K. Vogler, "Advanced F2–Laser for Microlithography," *Proceedings of SPIE 25th Annual International Symposium on Microlithography*, Santa Clara, Feb. 28–Mar. 3, 2000.

* cited by examiner

NARROW BANDWIDTH OSCILLATOR-AMPLIFIER SYSTEM

PRIORITY

This application claims the benefit of priority to U.S. provisional patent application No. 60/228,184, filed Aug. 25, 2000, and this application is a Continuation-in-Part application which claims the benefit of priority to U.S. patent application Ser. No. 09/883,128, filed Jun. 15, 2001, which claims the benefit of priority to U.S. provisional patent applications No. 60/212,301, filed Jun. 19, 2000 and No. 60/297,199, filed Jun. 7, 2001.

BACKGROUND

1. Field of the Invention

The invention relates to molecular fluorine lasers emitting around 157 nm, and particularly to a very narrow characteristic bandwidth and low spectral purity emitting molecular fluorine laser oscillator followed by an amplifier for increasing the energy of the emitted laser beam to a desired power for applications processing.

2. Description of the Related Art

Ultra-narrow bandwidth emission is required for the $F_2$-laser to make refractive optics projection lenses usable for 157 nm lithography. Recent investigations have shown that the natural bandwidth of emission may be around 0.60±0.10 pm for an $F_2$-laser under normal operation conditions. Also, line narrowing is possible down to about $\leq 0.15$ pm with special resonator designs containing sensitive optical elements. However, using such optical line-narrowing resonators causes the output energy to drop remarkably down to $\leq 1$ mJ. To get a desired output energy, e.g., around 10 mJ, one solution is to use an oscillator-amplifier design (see U.S. patent application Ser. No. 09/599,130 which is assigned to the same assignee as the present application and is hereby incorporated by reference).

The advantageous oscillator-amplifier design described in the '130 application provides a very narrow bandwidth laser beam at desired energies for application processing such as photolithography. Use of the design set forth in the '130 application also involves synchronization of two laser systems, i.e., the oscillator and the amplifier, in parallel, which can be expensive, can tend to occupy a lot of space and may be unreliable under certain circumstances. Preliminary experiments have shown that the oscillator-amplifier stage described in the '130 application can provide an advantageous 157 nm laser beam for application processing. However, the design may also present, in some circumstances, a competitively disadvantageous economic solution relative to systems which would use the natural bandwidth of emission of the $F_2$ laser for use with an imaging system having a catadioptric lens design.

It is therefore an object of the present invention to provide a more compact, economic molecular fluorine laser system which emits a beam around 157 nm having a narrow bandwidth and sufficient power for application processing.

SUMMARY OF THE INVENTION

In view of the above object, a molecular fluorine ($F_2$) laser system is provided including a seed oscillator and a power amplifier. The seed oscillator includes a laser tube including multiple electrodes therein which are connected to a discharge circuit. Seed radiation may alternatively be provided by an excimer lamp preferably maintained at low pressure. The laser tube is part of an optical resonator for generating a laser beam including a first line of multiple characteristic emission lines around 157 nm. The laser tube is filled with a gas mixture including molecular fluorine and a buffer gas. The gas mixture is at a pressure below that which results in the generation of a laser emission including the first line around 157 nm having a natural linewidth of less than 0.5 pm without an additional line-narrowing optical component for narrowing the first line. The power amplifier increases the power of the beam emitted by the seed oscillator to a desired power for applications processing.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, and a power amplifier for increasing the power of the beam generated by the resonator to a desired power for applications processing. The gas mixture has a total pressure which is sufficiently low such that the laser beam includes the first line around 157 nm having a linewidth of less than 0.5 pm while the resonator does not include an additional line-narrowing optical component for further narrowing the linewidth of the first line.

A molecular fluorine laser system is further provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, and a power amplifier for increasing the power of the beam generated by the resonator to a desired power for applications processing. The resonator includes at least one line-narrowing optical component for narrowing a linewidth of the first line around 157 nm. The gas mixture has a total pressure which is sufficiently low such that the line-narrowed first line has a linewidth of less than 0.2 pm.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, a gas handling unit coupled with the discharge tube for flowing gas between the discharge tube and the gas handling unit, a processor for controlling the flow of gases between the gas handling unit and the discharge tube to control one or more parameters associated with the gas mixture, and a power amplifier for increasing the power of the beam generated by the resonator to a desired power for applications processing. The gas mixture has a total pressure which is sufficiently low such that the laser beam includes the first line around 157 nm having a linewidth of less than 0.5 pm.

A molecular fluorine laser system is also provided including a discharge tube filled with a gas mixture including molecular fluorine and a buffer gas, multiple electrodes within the discharge chamber connected to a discharge circuit for energizing the gas mixture, a resonator for generating a laser beam including a first line of multiple characteristic emission lines around 157 nm, a gas handling unit coupled with the discharge tube for flowing gas between the discharge tube and the gas handling unit, and a processor for controlling the flow of gases between the gas handling unit and the discharge tube to control one or more parameters associated with the gas mixture. The gas mixture has a total pressure which is sufficiently low such that the laser beam includes the first line around 157 nm having a linewidth of less than 0.5 pm.

A method for controlling a bandwidth of an excimer or molecular fluorine laser system is also provided, including the steps of operating the laser system, monitoring the bandwidth of an output beam of the laser system, controlling a gas mixture pressure within a laser tube of the laser system at a predetermined pressure that is sufficiently low such that the output beam includes a first line of multiple characteristic emission lines around 157 nm having a linewidth of less than 0.5 pm, and amplifying the output beam for increasing the power of the beam generated by the resonator to a desired power for applications processing.

A method for controlling a bandwidth of an excimer or molecular fluorine laser system is further provided including operating the laser system, monitoring the bandwidth of an output beam of the laser system, and controlling a gas mixture pressure within a laser tube of the laser system at a predetermined pressure that is sufficiently low such that the output beam includes a first line of multiple characteristic emission lines around 157 nm having a linewidth of less than 0.5 pm.

A method for controlling a bandwidth of an excimer or molecular fluorine laser system is also provided including operating the laser system, and controlling a gas mixture pressure within a laser tube of the laser system at a predetermined pressure that is sufficiently low such that the output beam includes a first line of multiple characteristic emission lines around 157 nm having a linewidth of less than 0.5 pm.

A method for controlling a bandwidth of an excimer or molecular fluorine laser beam generating system including a low pressure gas lamp and an optical amplifier is also provided, including operating the laser system, monitoring the bandwidth of radiation emitted by the lamp, controlling a gas mixture pressure within the gas lamp of the laser system at a predetermined pressure that is sufficiently low such that the output beam includes a line having a linewidth of less than 0.5 pm, and amplifying the radiation emitted by the gas lamp for increasing the power of the beam generated by the lamp to a desired power for applications processing.

An excimer or molecular fluorine ($F_2$) laser system is further provided including a seed radiation generating excimer or molecular fluorine gas lamp filled with a gas mixture at least including molecular fluorine and a power amplifier. The gas mixture is at a pressure below that which results in the generation of a seed radiation emission having a natural linewidth of less than 0.5 pm. The power amplifier increases the power of the radiation emitted by the seed radiation generating gas lamp to a desired power for applications processing.

A molecular fluorine ($F_2$) laser system is also provided including a seed radiation generating molecular fluorine gas lamp filled with a gas mixture at least including molecular fluorine and a power amplifier. The gas mixture is at a pressure below that which results in the generation of a seed radiation emission around 157 including a line having a natural linewidth of less than 0.5 pm. The power amplifier increases the power of the line to a desired power for applications processing.

INCORPORATION BY REFERENCE

What follows is a cite list of references which are, in addition to those references cited above in the background section and the background and invention summary section themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. patent application Ser. Nos. 09/453,670, 09/447,882, 09/317,695, 09/512,417, 09/599,130, 09/598,552, 09/695,246, 09/712,877, 09/574,921, 09/738,849, 09/718,809, 09/733,874 and 09/780,124, 60/267,567, 09/883,128, 60/212,257, 09/791,431 and 09/771,013, which are assigned to the same assignee as the present application;

U.S. Pat. No. 6,154,470, 6,157,662, 6,219,368, 5,150,370, 5,596,596, 5,642,374, 5,559,816, and 5,852,627, 6,005,880, and 5,901,163; and all patent, patent application and non-patent references mentioned in the background or specification of this application; and K. Vogler, "Advanced $F_2$-laser for Microlithography", Proceedings of the SPIE 25*th* Annual International Symposium on Microlithography, Santa Clara, Feb. 28–Mar 3, 2000, p.1515; and European patent no. EP 0 472 727 B1.

DETAILED DESCRIPTION OF THE PREFERRED EMBODIMENTS

It is recognized herein that the natural bandwidth of the $F_2$ laser emission is sensitively dependent on the overall gas pressure within the laser tube (see U.S. patent application Ser. No. 09/883,128, which is assigned to the same assignee as the present application and is hereby incorporated by reference). The reduction of the total pressure of the laser gas from, e.g., 3000 mbar (representing a typical operating condition) down to 1500 mbar or even below 1000 mbar produces an advantageous reduction in the natural bandwidth of emission of the $F_2$-laser, in accordance with a preferred embodiment herein. In an alternative to many of the preferred embodiments described herein, a lamp containing molecular fluorine preferably at low pressure is used to generate seed radiation at a narrow bandwidth. This alternative embodiment may be used to generate narrow band radiation around 157 nm, and may also be used to provide narrow band radiation around 193 nm or 248 nm, by using a lamp with a gas mixture including an appropriate amount of argon or krypton, respectively. The natural or characteristic linewidth of a spectral emission line around 157 nm of an $F_2$ laser may advantageously be decreased in this way down to 0.4 pm or even below 0.2 pm or 0.1 pm. These bandwidths are in the range of bandwidths that may be used with refractive optics lens designs either containing two materials for chromatic correction for 0.4 pm or less exposure radiation (e.g., $CaF_2$ and $BaF_2$) or only a single optical material (e.g., $CaF_2$) for 0.2 pm or less exposure radiation.

This pressure decrease is also accompanied by a drop in the output energy, which may be an energy reduction by a factor of 10 or more. It is further recognized herein, therefore, that an amplifier may be used for producing a beam having sufficient energy. It is further recognized herein that the expensive and sometimes unreliable optical components typically used to produce a very narrow bandwidth can be omitted, and the seed radiation emitted from a $F_2$-laser tube at low gas pressure without line-narrowing optical elements can be amplified within a second tube to the level which is desired for application in 157 nm lithography. In the alternative embodiment mentioned above, wherein a low pressure lamp is used to provide the seed radiation to be amplified by the amplifier, the amplifier does in fact amplify even the seed radiation emitted by the lamp to the desired power for lithographic processing at 157 nm, 193 nm or 248 nm. A significant advantage is that only a very simple, small, inexpensive low-pressure discharge tube, or lamp, is used to produce a very narrow linewidth $F_2$-laser gas emission which serves as seed radiation for a large amplifier stage. Moreover, use of such line-narrowing optical element or elements may be used to further reduce the linewidth, if desired. Our own measurements have shown that already a seed energy of around 100 µJ is sufficient to be effectively amplified up to 10 mJ in the amplifier stage. Even being an amplifier laser system of usually large dimensions with only small low-pressure seeding discharge is advantageously not much more expensive than a normal large one-stage oscillator by itself.

In accordance with one embodiment herein, an object of the invention is to produce a very narrow-linewidth $F_2$-laser emission of $\leq 0.4$ pm or $\leq 0.2$ pm, etc. with sufficient power without large and expensive efforts which would usually involve two bulky lasers, one serving as line-narrowed oscillator and the other as power amplifier. With the application of this preferred embodiment, a powerful laser amplifier (of usual laser dimension) is combined with a small, inexpensive laser discharge tube containing the same $F_2$-laser gas mixture as the bulky laser, and at an atypically low pressure which serves to produce the very narrow bandwidth desired without having additional line-narrowing optical components within the laser resonator. Moreover, this small and simple discharge tube can be advantageously integrated into a normal laser cabinet of the amplifier. Thus, you have basically only one laser system producing this advantageous very narrow $F_2$-laser emission at sufficient energy. Such a system is advantageously competitive with a usual one stage oscillator design for catadioptic optical projection systems. In accordance with an alternative embodiment, a line-narrowed oscillator having a reduced gas mixture pressure may be used for still further narrowing the linewidth of a 157 nm line of the $F_2$ laser emission.

Figure 1:
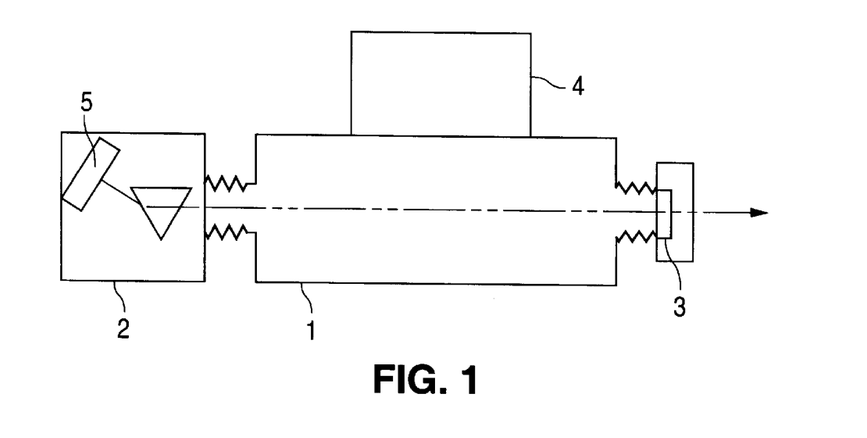
FIG. 1 schematically illustrates a molecular fluorine laser emitting a 157 nm beam including a selected line having a natural bandwidth of around 0.6 pm±0.1 pm at a typical energy of around 10 mJ and having a gas mixture pressure above 2500 mbar.

FIG. 1 schematically illustrates a molecular fluorine laser emitting a 157 nm beam including a selected line having a natural linewidth of around 0.6 pm±0.1 pm at a typical energy of between 1–15 mJ, and more particularly preferably around 10 mJ, and having a gas mixture pressure above 2500 mbar. The oscillator shown at FIG. 1 may be operated at a reduced gas mixture pressure for producing a 157 nm beam at a reduced linewidth according to a preferred embodiment.

Referring to FIG. 1, a single stage $F_2$-laser (only oscillator variant) emitting a natural bandwidth at a usual energy level, e.g., 10 mJ, is schematically shown the $F_2$-laser shown includes a laser chamber 1 containing a $F_2$ laser gas mixture including molecular fluorine and a buffer gas. The gas mixture may be at a normal pressure around 2500–3000 mbar or may be operated at reduced pressure according to a preferred embodiment herein. The $F_2$-laser shown in FIG. 1 also includes a line selection unit 2 containing an optical dispersion arrangement, e.g., a dispersion prism, while alternative or additional optics may be included such as a grating or an interferometric device such as an etalon or a device having non-parallel plates such as may be described at U.S. patent application Ser. Nos. 09/715,803 and/or 60/280,398, which are assigned to the same assignee as the present application and are hereby incorporated by reference. The line selection unit 2 may be left out for multiple line emission around 157 nm, and if used, would be preferably configured to select a main line around 157.63 nm. The $F_2$-laser shown schematically at FIG. 1 further includes an output coupler mirror 3, a laser discharge circuit and solid state pulser 4, and a high-reflection mirror 5, although alternatives to the partially reflecting output coupler 3 and HR mirror 5 may be provided as discussed below with reference to FIG. 8.

Figure 2:
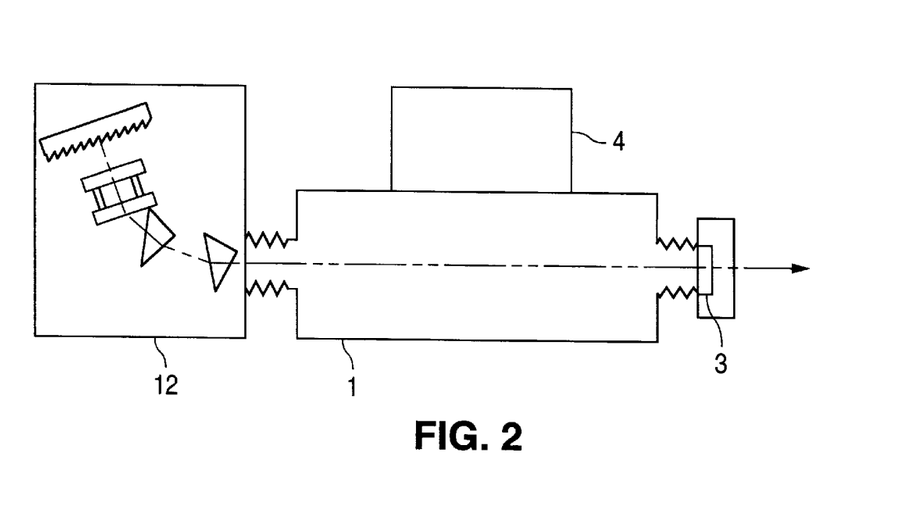
FIG. 2 schematically illustrates a molecular fluorine laser emitting a 157 nm beam including a selected and line-narrowed line having a bandwidth below 0.5 pm, such as around 0.2 pm, at a typical energy of around 1 mJ.

FIG. 2 schematically illustrates a molecular fluorine laser emitting a 157 nm beam including a selected and line-narrowed line having a bandwidth below 0.5 pm, such as around 0.2 pm, at a typical energy of around 1 mJ, even if the gas mixture pressure is at 2500–3000 mbar, although the gas mixture pressure may be reduced according to a preferred embodiment herein. Referring to FIG. 2, a single-stage $F_2$ laser (only oscillator) is shown. The $F_2$-laser schematically illustrated at FIG. 2 includes the laser chamber 1, discharge circuit and solid state pulser module 4 and output coupler 3, preferably the same as or similar to that described above with respect to FIG. 1 (see discussion below with reference to FIG. 8 for more details of the preferred system). The optical resonator includes a sophisticated optical design including a special line-narrowing module 12 which contains complicated and expensive optical components relative to the design of FIG. 1 (although the stability of these special optical elements: e.g., gratings, etalons, may be somewhat low at 157 nm). The module 12 may be configured for line-selection of a single line in addition to line-narrowing of the selected line, or may be configured only to narrow one (or more) of the emission lines around 157 nm. The many components, including prisms, which are inserted into the beam path of the resonator of the system of FIG. 2 produce greater losses than the simple design shown in FIG. 1. Thus, the overall output energy will be reduced with each element which is used for improved line-narrowing.

Figure 3:
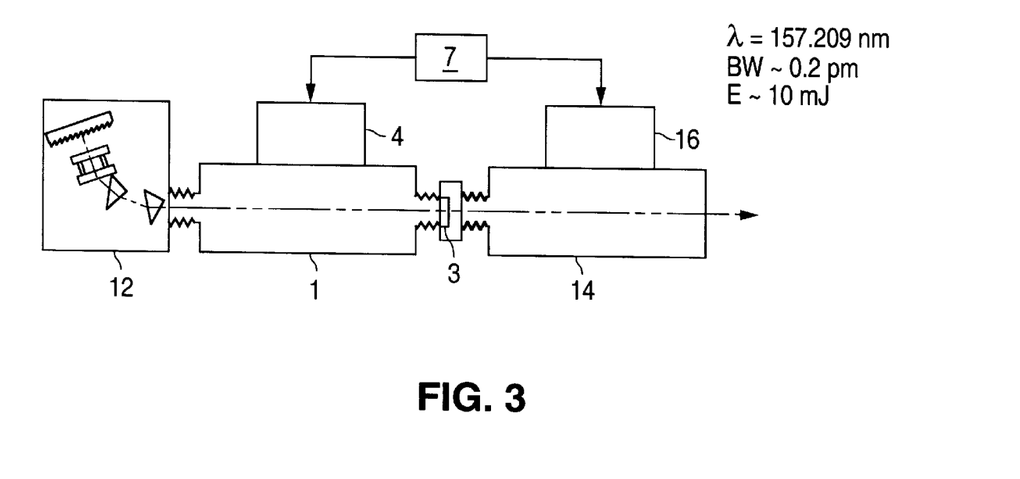
FIG. 3 schematically illustrates a molecular fluorine laser including an oscillator-amplifier configuration for generating a 157 nm beam including a selected and line-narrowed line having a bandwidth below 0.5 pm, such as around 0.2 pm, at an energy around 10 mJ.

FIG. 3 schematically illustrates a molecular fluorine laser including an oscillator-amplifier configuration for generating a 157 nm beam including a selected and line-narrowed line having a bandwidth below 0.5 pm, such as around 0.2 pm, at an energy between 1–15 mJ and particularly preferably around 10 mJ. The arrangement of FIG. 3 may be the same as or similar to that described with reference to FIG. 2, except that the arrangement of FIG. 3 includes a power amplifier 14 for increasing the energy of the beam emitted by the oscillator.

Referring to FIG. 3, an oscillator-amplifier configuration of an $F_2$ laser system (two-stage $F_2$ laser system) is schematically shown. The oscillator shown includes the laser chamber 1, discharge circuit including solid state pulser module 4, output coupler 3, and line-narrowing module 12, described above with reference to FIG. 3. The low-level output energy of the oscillator which contains the line-narrowing module 12 is amplified in a following up $F_2$ amplifier, which includes a separate amplifier chamber 14 and discharge circuit 16, to the desired level, e.g., 1–15 mJ, and particularly around preferably 10 mJ level typical for lithography applications. The gas mixtures within the oscillator chamber 1 and the amplifier chamber 14 may be operated at the normal laser gas pressure, e.g., P=2500 to 3000 to 4000 mbar, or the gas pressure, particularly in the oscillator chamber 1, may be at a reduced pressure. Both individually designed and optimized discharge circuits 4 and 16 (both preferably comprising a solid state pulser module) are precisely synchronized, e.g., within ≦2 μs by a synchronization module 7 (see U.S. Pat No. 6,005,880 and U.S. patent application Ser. No. 60/204,095, each of which is assigned to the same assignee as the present application and is hereby incorporated by reference). Both an unreliable synchronization and a strong spontaneous emission of the oscillator stage may cause a strong background radiation of the amplified narrow band signal, such as that illustrated at FIG. 5. Thus the total system can be very expensive, as including substantially two complete laser systems, very bulky, and produces a narrow-line output with somewhat poor spectral purity. As a whole, the system schematically illustrated at FIG. 3 may not be competitive against, e.g., the system shown in FIG. 1 using the natural bandwidth for catadioptric lens systems, although a narrow linewidth may be achieved at a desired power, e.g., 10 mJ for lithography applications.

Figure 4:
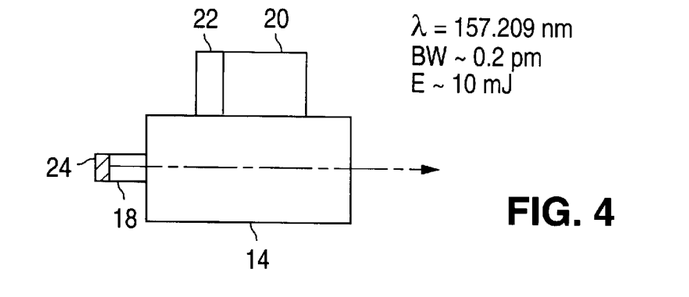
FIG. 4 schematically illustrates a molecular flourine laser including a low gas pressure seed oscillator-amplifier configuration for generating a 157 nm beam including a selected line having a natural bandwidth below 0.5 pm, such as around 0.2 pm, at an energy around 10 mJ.

FIG. 4 schematically illustrates a molecular flourine laser including a low gas pressure seed oscillator-amplifier configuration for generating a 157 nm beam including a line having a natural linewidth below 0.5 pm, such as around 0.2 pm, at an energy between 1–15 mJ and particularly preferably around 10 mJ for lithography applications. Referring to FIG. 4, a quasi-single stage amplifier arrangement is shown in accord with a preferred embodiment. Only one laser module with a small seed tube 18 having a low gas mixture pressure is used. The low-pressure seed tube, e.g., having a pressure less than 2000 mbar and preferably less than 1000–1500 mbar which contains the same laser gas mixture as the gain laser module (amplifier), e.g., $F_2$ (5% in Ne or He): Ne or He=(1–2) %: (99 to 98) %, but at a much lower pressure with a very narrow linewidth, e.g., less than 0.5 pm and preferably 0.2 pm or less, of the approximately 157.6309 nm emission line. This radiation is amplified in the normal pressure amplifier module including amplifier chamber 14 and discharge circuit 20 having preferably P=2500 to 4000 mbar (same gas mix) to the 1–15 mJ, and particularly preferably around 10 mJ, level. Because the very low-pressure seed radiation may be only about 100 μJ for being sufficiently amplified, an amplification factor of 100 or more is advantageously easily achievable with the system of the preferred embodiment. The low-pressure discharge tube or module is advantageously compact. Therefore, the background radiation level which enters the amplifier from this small tube 18 is greatly reduced from that produced by the system of FIG. 3. The seed tube 8 may be pre-discharged in a similar manner as the pre-ionization of a typical excimer discharge tube, e.g., by a separate part 22 of the amplifier discharge module 20. The system may be operated without the synchronization module 7 of the arrangement of FIG. 3. A HR mirror 24 provides a backward laser emission.

Figure 5A:
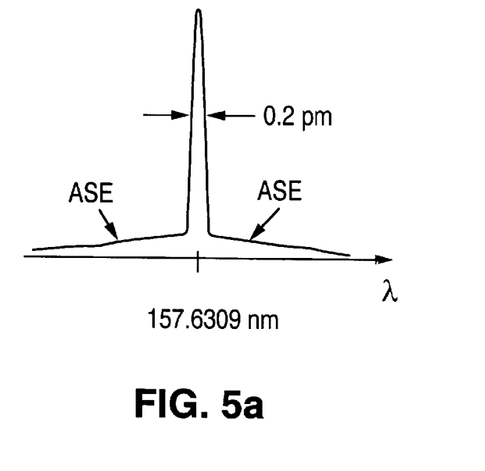
FIG. 5a is a qualitative illustration of the bandwidth and spectral purity of the beam emitted by the molecular fluorine laser of FIG. 3.
Figure 5B:
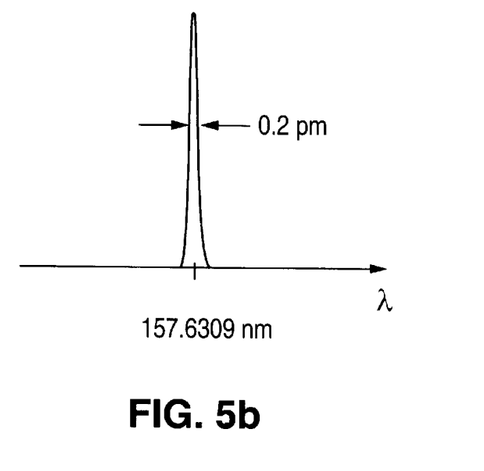
FIG. 5b is a qualitative illustration of the bandwidth and spectral purity of the beam emitted by the molecular fluorine laser of FIG. 4.

FIGS. 5a and 5b are qualitative illustrations of the bandwidth and spectral purity of the beam emitted by the molecular fluorine laser of FIGS. 3 and 4, respectively. Referring to FIGS. 5a and 5b, the spectral purity of both amplifier setups given in FIGS. 3 and 4 are respectively shown. A strong background radiation of the high-pressure long gain length (usual dimension laser module) produces a strong ASE-background in the amplified output of the narrow-bandwidth emission for the system of FIG. 3 as illustrated at FIG. 5a.

In contrast, FIG. 5b illustrates the output of the system of FIG. 4. The small, low-pressure submodule acting as a seed source for the following amplifier does not emit a substantial background ASE radiation, which could be amplified in the high-pressure amplifier together with the narrow-bandwidth emission. Therefore, the spectral purity of the narrow-bandwidth emission setup schematically illustrated at FIG. 4, with negligible ASE level, is advantageous for lithography applications.

Figure 6A:
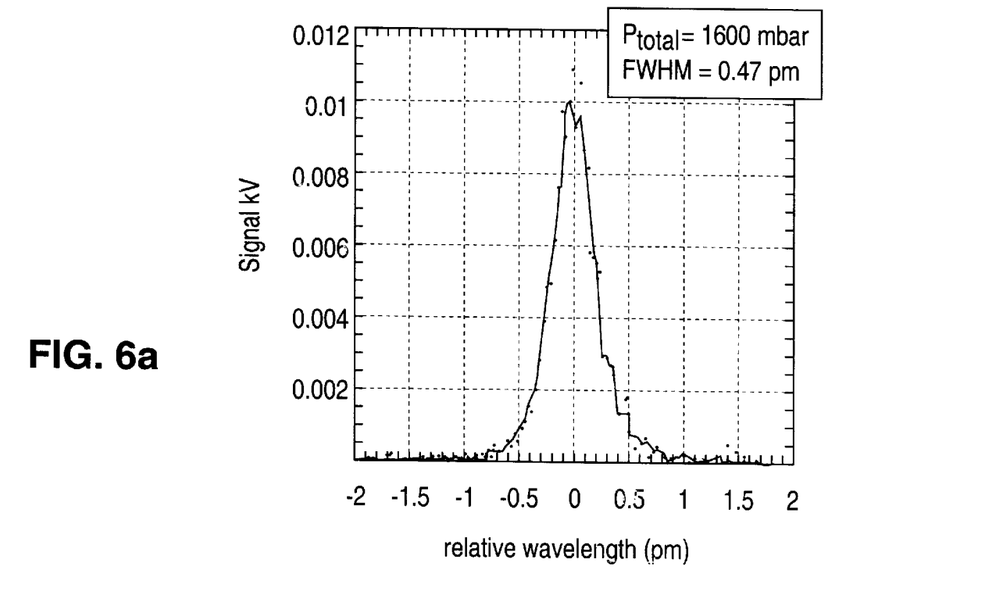
FIG. 6a quantitatively illustrates a molecular fluorine laser emission spectrum, wherein the $F_2$ laser is operated at a reduced gas pressure of 1600 mbar and has a bandwidth around less than 0.47 pm without deconvolution by the apparatus function of the spectrometer.
Figure 6B:
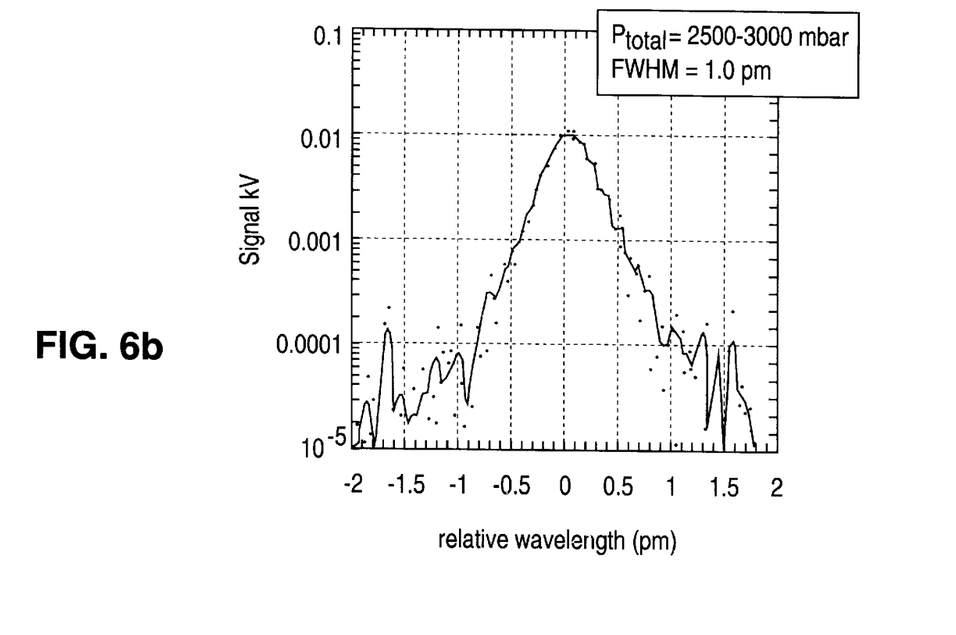
FIG. 6b quantitatively illustrates a molecular fluorine laser emission spectrum, wherein the $F_2$ laser is operated at a gas pressure between 2500–3000 mbar and has a bandwidth around 1 pm.

FIG. 6a quantitatively illustrates a molecular fluorine laser emission spectrum, wherein the $F_2$ laser is operated at a reduced gas pressure of 1600 mbar and has a bandwidth around less than 0.47 pm without deconvolution by the apparatus function of the spectrometer. In contrast, FIG. 6b quantitatively illustrates a molecular fluorine laser emission spectrum, wherein the $F_2$ laser is operated at a gas pressure between 2500–3000 mbar and has a bandwidth around 1 pm.

Figure 7:
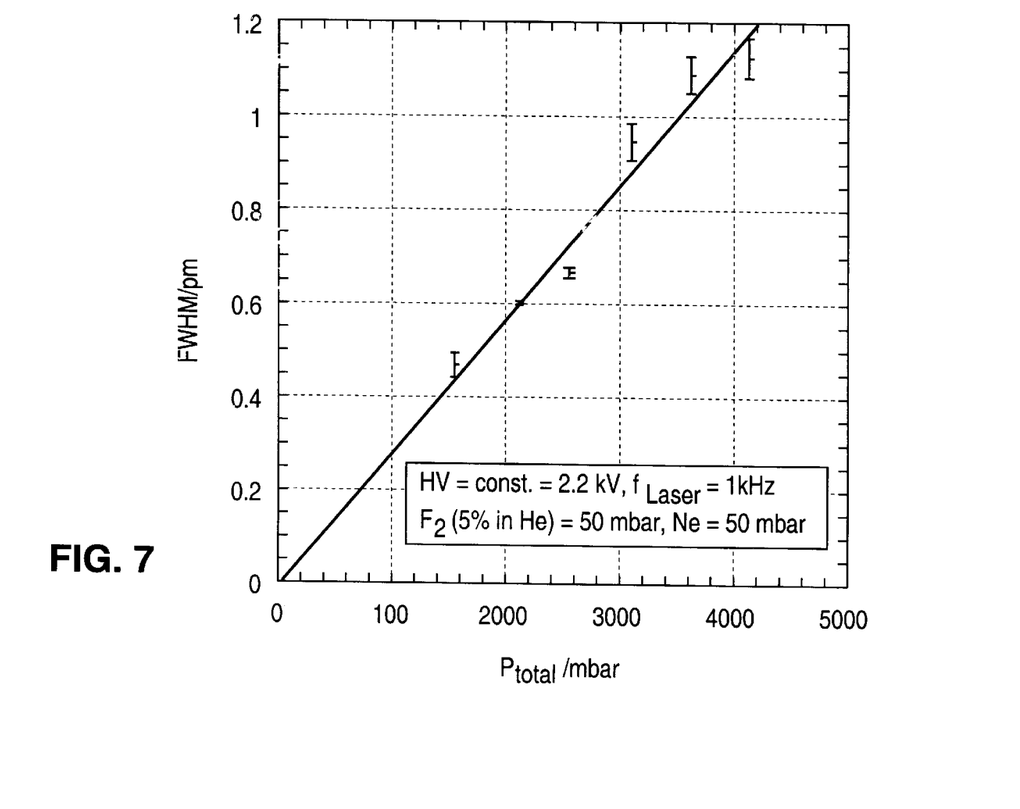
FIG. 7 illustrates a dependence of the bandwidth of an $F_2$ laser emission on the total pressure of the laser gas mixture within the laser tube and demonstrating a reduction in bandwidth with a reduction in total laser gas mixture pressure at an approximately constant fluorine-buffer gas partition.

FIG. 7 illustrates a dependence of the bandwidth of an $F_2$ laser emission on the total pressure of the laser gas mixture within the laser tube and demonstrating a reduction in bandwidth (or FWHM of the main line around 157.63 nm) with a reduction in total laser gas mixture pressure at an approximately constant fluorine-buffer gas partition. The gas mixture of the $F_2$-laser used in measurement the graph of FIG. 7 had between $F_2$ (5% in Ne): He=(1–2%: 99–98%), for gas pressure from around 4000 to 1500 mbar, as shown. The bandwidth is observed to be around 1.2 pm for a gas pressure of about 4000 mbar. The bandwidth is observed to be around 0.8 pm for a gas pressure of about 3000 mbar. The bandwidth is observed to be around 0.6 pm for a gas pressure of about 2000 mbar. The bandwidth is observed to be around 0.4 pm for a gas pressure of about 1500 mbar. The bandwidth is observed to be around 0.3 pm for a gas pressure of less than about 1000 mbar. The bandwidth is observed to be around 0.2 pm for a gas pressure of about 800 mbar. The bandwidth is observed to be around 0.15 pm for a gas pressure of about 600 mbar. The bandwidth versus total pressure of the laser gas is observed to be highly linear.

General Description of Overall Laser System

Figure 8:
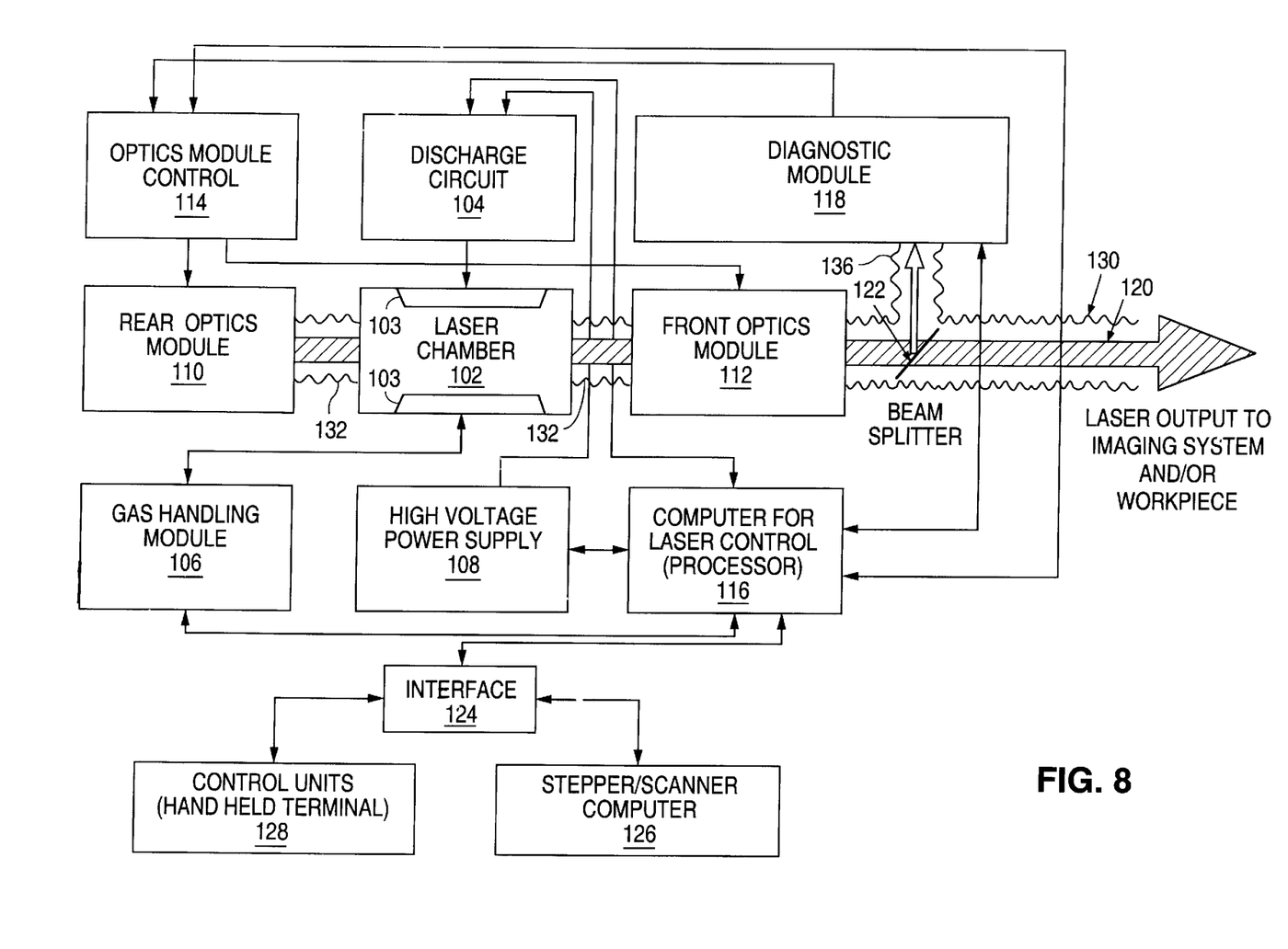
FIG. 8 schematically illustrates an overall molecular fluorine laser system according to a preferred embodiment.

FIG. 8 schematically illustrates an overall molecular fluorine laser system according to a preferred embodiment. The seed oscillator shown in FIG. 4 will be generally less complicated than that described below, although selected configurations may include some of the details of the system set forth below, while the systems of FIGS. 1–3 are more generally related the arrangement of Figure. Referring to FIG. 8, an excimer or molecular fluorine laser system is schematically shown according to a preferred embodiment. The preferred gas discharge laser system is a VUV laser system, such as a molecular fluorine ($F_2$) laser system, for use with a vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 8 to meet the requirements of that application. For this purpose, alternative DUV or VUV laser system and component configurations are described at U.S. patent application Ser. Nos. 09/317,695, 09/130,277, 09/244,554, 09/452,353, 09/512,417, 09/599,130, 09/694,246, 09/712,877, 09/574,921, 09/738,849, 09/718,809, 09/629,256, 09/712,367, 09/771,366, 09/715,803, 09/738,849, 60/202,564, 60/204,095, 09/741,465, 09/574,921, 09/734,459, 09/741,465, 09/686,483, 09/715,803, and 09/780,124, and U.S. Pat. Nos. 6,005,880, 6,061,382, 6,020,723, 5,946,337, 6,014,206, 6,157,662, 6,154,470, 6,160,831, 6,160,832, 5,559,816, 4,611,270, 5,761,236, 6,212,214, 6,154,470, and 6,157,662, each of which is assigned to the same assignee as the present application and is hereby incorporated by reference.

The system shown in FIG. 8 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, rare and buffer gases, and preferably a gas additive, may be injected or filled into the laser chamber, preferably in premixed forms (see U.S. patent application Ser. No. 09/513,025, which is assigned to the same assignee as the present application, and U.S. Pat. No. 4,977,573, which are each hereby incorporated by reference) for ArF, XeCl and KrF excimer lasers, and halogen and buffer gases, and any gas additive, for the $F_2$ laser. For the high power XeCl laser, the gas handling module may or may not be present in the overall system. The solid-state pulser module 104 is powered by a high voltage power supply 108. A thyratron pulser module may alternatively be used. The laser chamber 102 is surrounded by optics module 110 and optics module 112, forming a resonator. The optics module may include only a highly reflective resonator reflector in the rear optics module 110 and a partially reflecting output coupling mirror in the front optics module 112, such as is preferred for the high power XeCl laser. The optics modules 110 and 112 may be controlled by an optics control module 114, or may be alternatively directly controlled by a computer or processor 116, particular when line-narrowing optics are included in one or both of the optics modules 110,112, such as is preferred when KrF, ArF or $F_2$ lasers are used for optical lithography.

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion of the beam toward the module 118, such as preferably a beam splitter module 122. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126,128 and/or other external systems.

Laser Chamber

The laser chamber 102 contains a laser gas mixture and includes one or more preionization electrodes (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units are set forth at U.S. patent application Ser. No. 09/692,265 (particularly preferred for KrF, ArF, $F_2$ lasers), Ser. Nos. 09/532,276 and 09/247,887, each of which is assigned to the same assignee as the present application, and alternative embodiments are set forth at U.S. Pat. Nos. 5,337,330, 5,818,865 and 5,991,324, all of the above patents and patent applications being hereby incorporated by reference.

Solid State Pulser Module

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply may be described at U.S. patent application Ser. Nos. 09/640,595, 60/198,058, 60/204,095, 09/432,348 and 09/390,146, and 60/204,095, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

Laser Resonator

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. In accord with a preferred embodiment herein, optics for selecting one of multiple lines around 157 nm may be used, e.g., one or more dispersive prisms or birefringent plates or blocks, wherein additional line-narrowing optics for narrowing the selected line may be left out. The total gas mixture pressure is preferably lower than conventional systems, e.g., lower than 3 bar, for producing the selected line at a narrow bandwidth such as 0.5 pm or less without using additional line-narrowing optics.

As discussed, either no optics or merely a simple, not very lossy optical configuration for line-selection is included. Preferably and advantageously, the preferred embodiment of the present invention does not have additional line-narrowing optics in the laser resonator, or includes only line-selection optics for selecting the main line at $\lambda_1 \approx 157.63094$ nm and suppressing any other lines around 157 nm that may be naturally emitted by the $F_2$ laser. Therefore, in one embodiment, the optics module 10 has only a highly reflective resonator mirror, and the optics module 12 has only a partially reflective resonator reflector. In another embodiment, suppression of the other lines (i.e., other than $\lambda_1$) around 157 nm is performed, e.g., by an outcoupler having a partially reflective inner surface and being made of a block of birefringent material or a VUV transparent block with a coating, either of which has a transmission spectrum which is periodic due to interference and/or birefringence, and has a maximum at $\lambda_1$ and a minimum at a secondary line. In another embodiment, simple optics such as a dispersive prism or prisms may be used for line-selection only, and not for narrowing of the main line at $\lambda_1$. Other line selection embodiments are set forth at U.S. patent application Ser. Nos. 09/317,695, 09/657,396, and 09/599,130, each of which is assigned to the same assignee as the present application and is hereby incorporated by reference. The advantageous gas mixture pressure of the seed laser of the preferred embodiment enables a narrow bandwidth, e.g., below 0.5 pm, even without further narrowing of the main line at $\lambda_1$ using additional optics.

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110,112, or reconfiguration procedures (see the '353, '695, '277, '554, and '527 applications mentioned above).

Diagnostic Module

After a portion of the output beam 120 passes the outcoupler of the optics module 112, that output portion preferably impinges upon a beam splitter module 122 which includes optics for deflecting a portion of the beam to the diagnostic module 118, or otherwise allowing a small portion of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 122 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831 and 5,978,394, all of the above wavelength and/or bandwidth detection and monitoring components being hereby incorporated by reference. In accord with a preferred embodiment herein, the bandwidth is monitored and controlled in a feedback loop including the processor 116 and gas handling module 106. The total pressure of the gas mixture in the laser tube 102 is controlled to a particular value for producing an output beam at a particular bandwidth.

Other components of the diagnostic module may include a pulse shape detector or ASE detector, such as are described at U.S. patent application Ser. Nos. 09/484,818 and 09/418, 052, respectively, each of which is assigned to the same assignee as the present application and is hereby incorporated by reference, such as for gas control and/or output beam energy stabilization, or to monitor the amount of amplified spontaneous emission (ASE) within the beam to ensure that the ASE remains below a predetermined level, as set forth in more detail below. There may be a beam alignment monitor, e.g., such as is described at U.S. Pat No. 6,014,206, or beam profile monitor, e.g., U.S. patent application Ser. No. 09/780,124, which is assigned to the same assignee, wherein each of these patent documents is hereby incorporated by reference.

Beam Path Enclosures

Particularly for the molecular fluorine laser system, and for the ArF laser system, an enclosure 130 preferably seals the beam path of the beam 120 such as to keep the beam path free of photoabsorbing species. Smaller enclosures 132 and 134 preferably seal the beam path between the chamber 102 and the optics modules 110 and 112, respectively, and a further enclosure 136 is disposed between the beam splitter 122 and the diagnostic module 118. Preferred enclosures are described in detail in U.S. patent application Ser. Nos. 09/598,552, 09/594,892 and 09/131,580, which are assigned to the same assignee and are hereby incorporated by reference, and U.S. Pat. Nos. 6,219,368, 5,559,584, 5,221, 823, 5,763,855, 5,811,753 and 4,616,908, all of which are hereby incorporated by reference.

Processor Control

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 8, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or an spectral filter external to the resonator is used for narrowing the linewidth of the output beam. Several variations of line-narrowing optics are set forth in detail below.

Gas Mixture

The laser gas mixture is initially filled into the laser chamber 102 in a process referred to herein as a "new fills".

In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas Positions are described at U.S. Pat. Nos. 4,393,405, 6,157,162 and 4,977, 573 and U.S. patent application Ser. Nos. 09/513,025, 09/447,882, 09/418,052, and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the F2-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Although the preferred embodiments herein are particularly drawn to use with a $F_2$ laser, some gas replenishment actions are described for gas mixture compositions of other systems such as ArF, KrF, and XeCl excimer lasers, wherein the ideas set forth herein may also be advantageously incorporated into those systems.

Also, the gas composition for the $F_2$ laser in the above configurations uses either helium, neon, or a mixture of helium and neon as a buffer gas. The concentration of fluorine in the buffer gas preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture may range from 0.0001% to 0.1%, and would be preferably significantly below 0.1%. Some alternative gas configurations including trace gas additives are set forth at U.S. patent application Ser. No. 09/513,025 and U.S. Pat No. 6,157,662, each of which is assigned to the same assignee and is hereby incorporated by reference.

Preferably, a mixture of 5% $F_2$ in Ne with He as a buffer gas is used, although more or less He or Ne may be used. The total gas pressure is advantageously adjustable between 1500 and 4000 mbar for adjusting the bandwidth of the laser. The partial pressure of the buffer gas is preferably adjusted to adjust the total pressure, such that the amount of molecular fluorine in the laser tube is not varied from an optimal, pre-selected amount. The bandwidth is shown to advantageously decrease with decreased He and/or Ne buffer gas in the gas mixture. Thus, the partial pressure of the He and/or Ne in the laser tube is adjustable to adjust the bandwidth of the laser emission.

Gas Mixture Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977, 573, 6,212,214 and 5,396,514 and U.S. patent application Ser. Nos. 09/447,882, 09/418,052, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1% rare gas:99% buffer gas, for a rare gas-halide excimer laser, wherein for a $F_2$ laser premix B is not used. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

The halogen concentration in the gas mixture is maintained constant during laser operation by gas replenishment actions by replenishing the amount of halogen in the laser tube for the preferred molecular fluorine laser herein, such that these gases are maintained in a same predetermined ratio as are in the laser tube 102 following a new fill procedure. In addition, gas injection actions such as $\mu$Hls as understood from the '882 application, mentioned above, may be advantageously modified into micro gas replacement procedures, such that the increase in energy of the output laser beam may be compensated by reducing the total pressure. In contrast, or alternatively, conventional laser systems would reduce the input driving voltage so that the energy of the output beam is at the predetermined desired energy. In this way, the driving voltage is maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used for selecting the primary line $\lambda_1$ only, or may be used to provide additional line narrowing as well as performing lineselection, or the resonator may include optics for lineselection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Exemplary line-narrowing optics contained in the optics module 110 include a beam expander, an optional interferometric device such as an etalon or otherwise as described in the Ser. No. 09/715,803 application, incorporated by reference above, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the application Ser. No. 09/715,803, 09/738,849, and 09/718,809, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism or alternatively no line-narrowing or line-selection may be performed in the rear optics module 110. In the case of using an all-reflective imaging system, the laser may be configured for semi-narrow band operation such as having an output beam linewidth in excess of 0.6 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the application Ser. No. 09/771,366 and the U.S. Pat. No. 6,154,470, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

One or more apertures may be included in the resonator for blocking stray light and matching the divergence of the resonator (see the '277 application). As mentioned above, the front optics module may include line-narrowing optics (see the application Ser. Nos. 09/715,803, 09/738,849 and 09/718,809, each being assigned to the same assignee as the present application and hereby incorporated by reference), including or in addition to the outcoupler element.

Depending on the type and extent of line-narrowing and/or selection and tuning that is desired, and the particular laser that the line-narrowing optics are to be installed into, there are many alternative optical configurations that may be used other than those specifically described below with respect to FIGS. 1–4. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

As discussed, preferably there are no line-narrowing optics in the resonator that are subject to degradation or produce losses, wherein alternatively, only optics to select a single line (i.e., $\lambda_1$) may be used. However, line-narrowing optics may be used for further line-narrowing in combination with the line-narrowing and/or bandwidth adjustment that is performed by adjusting/reducing the total pressure in the laser chamber. For example, a natural bandwidth may be adjusted to 0.5 pm by reducing the partial pressure of the buffer gas to 1000–1500 mbar. The bandwidth could than be reduced to 0.2 pm or below using line-narrowing optics either in the resonator or external to the resonator. Thus, a general description of the line-narrowing optics that may be used are provided here. Exemplary line-narrowing optics are contained in the optics module 10, or the rear optics module, include a beam expander, an optional etalon and a diffraction grating, which produces a relatively high degree of dispersion, for a narrow band laser such as is used with a refractive or catadioptric optical lithography imaging system. The line-narrowing package may include a beam expander and one or more etalons followed by an HR mirror as a resonator reflector.

Optical Materials

In all of the above and below embodiments, the material used for any dispersive prisms, the prisms of any beam expanders, etalons, laser windows and the outcoupler is preferably one that is highly transparent at wavelengths below 200 nm, such as at the 157 nm output emission wavlength of the molecular fluorine laser. The materials are also capable of withstanding long-term exposure to ultra-violet light with minimal degradation effects. Examples of such materials are $CaF_2$, $MgF_2$, $BaF_2$, $LiF$ and $SrF_2$, and in some cases fluorine-doped quartz may be used. Also, in all of the embodiments, many optical surfaces, particularly those of the prisms, may or may not have an antireflective coating on one or more optical surfaces, in order to minimize reflection losses and prolong their lifetime.

Power Amplifier

A line-narrowed oscillator, e.g., a set forth above, may be followed by a power amplifier for increasing the power of the beam output by the oscillator. Preferred features of the oscillator-amplifier set-up are set forth at U.S. patent applications Nos. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the present invention, the molecular fluorine laser oscillator has an advantageous output coupler having a transmission interference maximum at $\lambda_1$ and a minimum at $\lambda_2$, and is described in more detail below. A 157 nm beam is output from the output coupler and is incident at the amplifier of this embodiment to increase the power of the beam. Thus, a very narrow bandwidth beam is achieved with high suppression of the secondary line 2 and high power (at least several Watts to more than 10 Watts).

With particular respect to the preferred embodiments, the molecular fluorine laser oscillator has an advantageous total gas pressure, or gas composition, that produces a very narrow band emission at $\lambda_1$ without optics that are typically used for achieving such a very narrow bandwidth, e.g., less than 0.5 pm. A 157 nm beam is output from the output coupler and is incident at the amplifier of this embodiment to increase the power of the beam. Thus, a very narrow bandwidth beam (e.g., less than 0.5 pm) is achieved with high power (at least several Watts to more than 10 Watts) and without sophisticated very narrow bandwidth line-narrowing optics.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A molecular fluorine ($F_2$) laser system, comprising:
   a seed source including a seed tube for generating a light beam at least including a first line around 157 nm, the seed tube being filled with a gas mixture at least including molecular fluorine, the gas mixture being at a sufficiently low pressure below 1800 mbar which results in the generation of a laser emission including said first line around 157 nm having a naturally-occurring linewidth devoid of any assistance by an optical component for narrowing the natural line, said sufficiently low pressure being adjustable to a selected pressure below 1800 mbar thereby producing a selected natural linewidth of less than 0.5 pm, and having an initial power below a target power for applications processing, and
   a power amplifier for increasing the power of the beam emitted by the seed source to a desired power for applications processing, the selected natural linewidth being at least enough such that the initial power of the seed source is amplified to the target power by said power amplifier.

2. The laser system of claim 1, further comprising at least one line-selection optical component for suppressing one or more lines of said multiple characteristic emission lines of the laser around 157 nm.

3. The laser system of claim 2, wherein only said first line is selected of said multiple characteristic emission lines and any other lines of said multiple characteristic emission lines are suppressed by said at least one line-selection optical component.

4. A laser system as in claim 1, wherein the seed source comprises a molecular fluorine gas lamp.

5. A molecular fluorine laser system, comprising:
   a seed oscillator and a power amplifier, the seed oscillator including:
      a seed rube filled with a gas mixture including molecular fluorine and a buffer gas;
      a plurality of electrodes within the seed rube connected to a discharge circuit for energizing the gas mixture;
      a resonator for generating a laser beam including a first line of multiple characteristic emission lines around 157 nm; and
   wherein said gas mixture has a total pressure which is sufficiently low and below 1800 mbar which results in the generation of said laser beam including said first line around 157 nm having a naturally-occurring linewidth devoid of any assistance by an optical component for narrowing the natural first line, said sufficiently low pressure being adjustable to a selected pressure below 1800 mbar thereby producing a selected natural linewidth of less than 0.5 pm, and having an initial power below a target power for applications processing; and
   the power amplifier for increasing the power of the beam generated by the seed oscillator to the target power for applications processing, the selected natural linewidth being at least enough such that the initial power of the seed source is amplified to the target power by said power amplifier.

6. The laser system of claim 5, wherein said resonator includes at least one line selection optical component for suppressing one or more lines of multiple characteristic emission lines around 157 nm of said laser system.

7. The laser system of claim 6, wherein only said first line is selected of said multiple characteristic emission lines and any other lines of said multiple characteristic emission lines are suppressed by said at least one line-selection optical component.

8. The laser system of any of claims 1 or 5, wherein said gas mixture pressure is less than 2000 mbar.

9. The laser system of claim 8, wherein said desired power corresponds to an energy of between 1–15 mJ.

10. The laser system of any of claims 1 or 5, wherein said linewidth of said first line is less than 0.4 pm.

11. The laser system of claim 10, wherein said gas mixture pressure is less than 1500 mbar.

12. The laser system of claim 11, wherein said desired power corresponds to an energy of between 1–15 mJ.

13. The laser system of any of claims 1 or 5, wherein said linewidth of said first line is less than 0.3 pm.

14. The laser system of claim 13, wherein said gas mixture pressure is less than 1300 mbar.

15. The laser system of claim 14, wherein said desired power corresponds to an energy between 1–15 mJ.

16. The laser system of any of claims 1 or 5, wherein said linewidth of said first line is less than 0.2 pm.

17. The laser system of claim 16, wherein said gas mixture pressure is less than 1000 mbar.

18. The laser system of claim 17, wherein said desired power corresponds to an energy of between 1–15 mJ.

19. The laser system of any of claims 1 or 5, wherein said linewidth of said first line is less than 0.15 pm.

20. The laser system of claim 19, wherein said gas mixture pressure is less than 800 mbar.

21. The laser system of claim 20, wherein said desired power corresponds to an energy of between 1–15 mJ.

22. The laser system of any of claims 1 or 5, further comprising:
   a gas handling unit coupled with the discharge tube for flowing gas between the discharge tube and the gas handling unit; and
   a processor for controlling the flow of gases between the gas handling unit and the discharge tube to control one or more parameters associated with the gas mixture.

23. A molecular fluorine laser system as in claim 5, the seed oscillator further comprising:
   at least one line-narrowing optical component for narrowing a linewidth of the first line around 157 nm, and
   wherein said gas mixture has a total pressure which is sufficiently low such that the line-narrowed first line has a linewidth of less than 0.2 pm.

24. The laser system of claim 23, wherein said resonator includes at least one line selection optical component for suppressing one or more lines of multiple characteristic emission lines around 157 nm of said laser system.

25. The laser system of claim 24, wherein only said first line is selected of said multiple characteristic emission lines and any other lines of said multiple characteristic emission lines are suppressed by said at least one line-selection optical component.

26. The laser system of claim 23, wherein said gas mixture pressure is less than 2000 mbar.

27. The laser system of claim 26, wherein said desired power corresponds to an energy of between 1–15 mJ.

28. The laser system of claim 23, wherein said linewidth of said first line is less than 0.15 pm.

29. The laser system of claim 23, wherein said linewidth of said first line is less than 0.10 pm.

30. The laser system of any of claims 23, 28 or 29, wherein said gas mixture pressure is less than 1500 mbar.

31. The laser system of claim 30, wherein said desired power corresponds to an energy of between 1–15 mJ.

32. The laser system of any of claims 23, 28 or 29, wherein said gas mixture pressure is less than 1000 mbar.

33. The laser system of claim 32, wherein said desired power corresponds to an energy of between 1–15 mJ.

34. The laser system of claim 23, further comprising:
a gas handling unit coupled with the discharge tube for flowing gas between the discharge tube and the gas handling unit; and
a processor for controlling the flow of gases between the gas handling unit and the discharge tube to control one or more parameters associated with the gas mixture.

35. A molecular fluorine laser system as in one of claim 1 or 5, further comprising:
a gas handling unit coupled with the seed tube for flowing gas between the seed tube and the gas handling unit;
a processor for controlling the flow of gases between the gas handling unit and the seed tube to control one or more parameters associated with the gas mixture.

36. The laser system of claim 35, wherein said resonator includes at least one line selection optical component for suppressing one or more lines of multiple characteristic emission lines around 157 nm of said laser system.

37. The laser system of claim 36, wherein only said first line is selected of said multiple characteristic emission lines and any other lines of said multiple characteristic emission lines are suppressed by said at least one line-selection optical component.

38. The laser system of claim 35, wherein said resonator does not include additional line-narrowing optical components for further narrowing the linewidth of the first line.

39. The laser system of claim 35, wherein said resonator includes at least one additional line-narrowing optical component for further narrowing the linewidth of the first line.

40. The laser system of claim 35, wherein said gas mixture pressure is less than 2000 mbar.

41. The laser system of claim 40, wherein said desired power corresponds to an energy of between 1–15 mJ.

42. The laser system of claim 35, wherein said linewidth is less than 0.4 pm.

43. The laser system of claim 42, wherein said gas mixture pressure is less than 1500 mbar.

44. The laser system of claim 43, wherein said desired power corresponds to an energy of between 1–15 mJ.

45. A method for controlling a bandwidth of a molecular fluorine laser system, comprising the steps of:
operating the laser system; and
controlling a gas mixture pressure within a laser tube of the laser system at a predetermined pressure that is sufficiently low and below 1800 mbar which results in the generation of an output beam including a first line of multiple characteristic emission lines around 157 nm having a naturally-occurring linewidth devoid of any assistance by an optical component for narrowing the natural first line, said sufficiently low pressure being adjustable to a selected pressure thereby producing a selected natural linewidth between less than substantially 0.15 pm and 0.5 pm.

46. A method as in claim 45, further comprising the step of:
monitoring the bandwidth of an output beam of the laser system.

47. A method as in one of claim 46 or 45, further comprising the step of:
amplifying the output beam for increasing the power of the beam generated by the resonator to a desired power for applications processing.

48. The method of claim 47, further comprising the step of suppressing one or more lines of multiple characteristic emission lines around 157 nm of said laser system.

49. The method of claim 47, wherein said suppressing step includes suppressing all but said first line of said multiple characteristic emission lines around 157 nm.

50. The method of claim 47, wherein the method does not include a step of further narrowing the linewidth of the first line using an additional line-narrowing optical component.

51. The method of claim 47, further comprising the step of further narrowing the linewidth of the first line using an additional line-narrowing optical component.

52. The method of claim 47, wherein the gas mixture pressure controlling step includes controlling the pressure to be less than 2000 mbar.

53. The method of claim 47, wherein said linewidth of said first line is less than 0.4 pm.

54. The method of claim 53, wherein said gas mixture pressure is less than 1500 mbar.

55. The method of any of claims 47, 52 or 53, wherein said desired power corresponds to an energy of between 1–15 mJ.

56. The method of claim 46, further comprising the step of amplifying the output beam for increasing the power of the beam generated by the resonator to a desired power for applications processing.

57. The method of claim 56, wherein said desired power corresponds to an energy of between 1–15 mJ.

58. The method of claim 46, further comprising the step of suppressing one or more lines of multiple characteristic emission lines around 157 nm of said laser system.

59. The method of claim 46, wherein the method does not include a step of further narrowing the linewidth of the first line using an additional line-narrowing optical component.

60. The method of claim 46, further comprising the step of further narrowing the linewidth of the first line using an additional line-narrowing optical component.

61. The method of claim 46, wherein said gas mixture pressure is less than 1500 mbar.

62. The method of claim 45, further comprising the step of monitoring the bandwidth of an output beam of the laser system.

63. The method of claim 45, further comprising the step of amplifying the output beam for increasing the power of the beam generated by the resonator to a desired power for applications processing.

64. The method of claim 63, wherein said desired power corresponds to an energy of between 1–15 mJ.

65. The method of claim 45, further comprising the step of suppressing one or more lines of multiple characteristic emission lines around 157 nm of said laser system.

66. The method of claim 45, wherein the method does not include a step of further narrowing the linewidth of the first line using an additional line-narrowing optical component.

67. The method of claim 45, further comprising the step of further narrowing the linewidth of the first line using an additional line-narrowing optical component.

68. The method of claim 45, wherein said gas mixture pressure is less than 1500 mbar.

69. A method for controlling a bandwidth of an excimer or molecular fluorine laser beam generating system including a low pressure gas lamp and an optical amplifier, comprising the steps of:

operating the laser system;

monitoring the bandwidth of radiation emitted by the lamp;

controlling a gas mixture pressure within the gas lamp of the laser system at a predetermined pressure that is sufficiently low and below 1800 mbar which results in the generation of an output beam including a line having a naturally-occurring linewidth devoid of any assistance by an optical component for narrowing the natural first line, said sufficiently low pressure being at a selected pressure thereby producing a selected natural linewidth of less than 0.5 pm, and the output beam including the line having an initial power below a target power for applications processing; and amplifying the radiation emitted by the gas lamp for increasing the power of the beam generated by the lamp to a desired power for applications processing, the selected natural linewidth being at least enough such that the initial power of the radiation emitted by the gas lamp is amplified to the target power by said power amplitier.

70. The method of claim 69, wherein the gas pressure of the lamp is controlled to be less than 2000 mbar.

71. The method of claim 69, wherein said linewidth of said line is less than 0.4 pm.

72. The method of claim 71, wherein said gas pressure of the lamp is controlled to be less than 1500 mbar.

73. The method of any of claims 69–72, wherein said desired power corresponds to an energy of between 1–15 mJ.

74. An excimer or molecular fluorine ($F_2$) laser system, comprising:

a seed radiation generating excimer or molecular fluorine gas lamp filled with a gas mixture at least including molecular fluorine, the gas mixture being at a sufficiently low pressure below 1800 mbar which results in the generation of a seed radiation emission having a naturally-occurring linewidth devoid of any assistance by an optical component for narrowing the natural first line, said sufficiently low pressure being at a selected pressure thereby producing a selected natural linewidth of less than 0.5 pm, and the seed radiation emission having an initial power below a target power for applications processing, and a power amplifier for increasing the power of the radiation emitted by the seed radiation generating gas lamp to the target power for applications processing, the selected natural linewidth being at least enough such that the initial power of the seed radiation is amplified to the target power by said power amplifier.

75. The laser system of any of claims 74 or 4, wherein said gas mixture pressure is less than 2000 mbar.

76. The laser system of claim 75, wherein said desired power corresponds to an energy of between 1–15 mJ.

77. The laser system of any of claims 74 or 4, wherein said linewidth of said line is less than 0.4 pm.

78. The laser system of claim 77, wherein said gas mixture pressure is less than 1500 mbar.

79. The laser system of claim 78, wherein said desired power corresponds to an energy of between 1–15 mJ.

80. The laser system of any of claims 74 or 4, wherein said linewidth of said line is less than 0.3 pm.

81. The laser system of claim 80, wherein said gas mixture pressure is less than 1300 mbar.

82. The laser system of claim 81, wherein said desired power corresponds to an energy between 1–15 mJ.

83. The laser system of any of claims 74 or 4, wherein said linewidth of said line is less than 0.2 pm.

84. The laser system of claim 83, wherein said gas mixture pressure is less than 1000 mbar.

85. The laser system of claim 84, wherein said desired power corresponds to an energy of between 1–15 mJ.

86. The laser system of any of claims 74 or 4, wherein said linewidth of said first line is less than 0.15 pm.

87. The laser system of claim 86, wherein said gas mixture pressure is less than 800 mbar.

88. The laser system of claim 87, wherein said desired power corresponds to an energy of between 1–15 mJ.

* * * * *